United States Patent Office 3,840,447
Patented Oct. 8, 1974

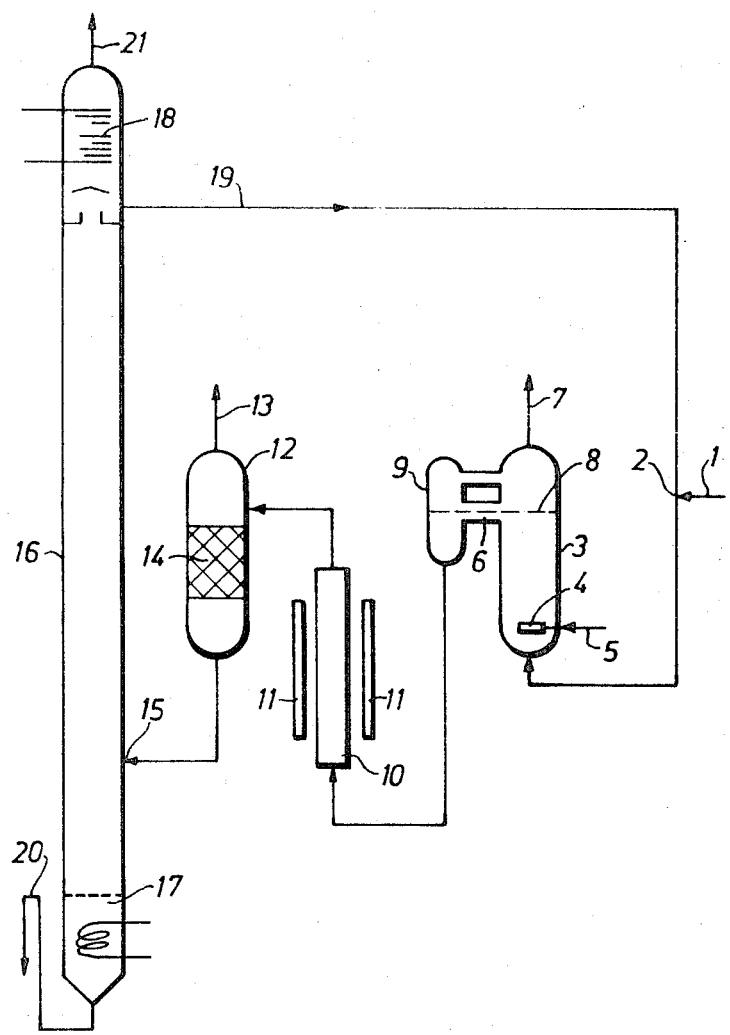

3,840,447
PROCESS AND APPARATUS FOR CHLORINATING METHYLCHLOROSILANES
Hans Joachim Lücking, Bergisch-Neukirchen, Klaus Seyfried, Schildgen, Walter Noll, Opladen, and Ludwig Fries, Leverkusen, Germany, assignors to Bayer Aktiengesellschaft, Leverkusen, Germany
Filed Oct. 6, 1972, Ser. No. 295,791
Claims priority, application Germany, Oct. 12, 1971, P 21 50 718.6
Int. Cl. B01j 1/00, 1/10
U.S. Cl. 204—158 HA                    1 Claim

ABSTRACT OF THE DISCLOSURE

In the production of a chloromethyl chlorosilane of the formula:

$$(ClCH_2)_a(CH_3)_bSiCl_{4-a-b}$$

in which $a$ is 1, 2, or 3, $b$ is 0, 1 or 2, and the sum of $a+b$ is not greater than 3, by reacting a methylchlorosilane of the formula:

$$(CH_3)_{a+b}SiCl_{4-a-b}$$

with chlorine in the liquid phase and under the action of radiation which initiates the photochemical reaction between chlorine and the methylchlorosilane, the improvement which comprises mixing the chlorine and the methylchlorosilane in a first zone with exclusion of light which would initiate the photochemical reaction, thereafter introducing the resulting solution free of undissolved gas into a second zone and exposing said solution to radiation to initiate the photochemical reaction in said second zone.
A corresponding apparatus is also described.

---

This invention relates to a process for the preparation of chloromethyl chlorosilanes by the reaction of methylchlorosilanes with chlorine in the liquid phase and to a suitable apparatus for carrying out this process.

It is known that chloromethyl chlorosilanes can be prepared by reacting methylchlorosilanes with chlorine in liquid or gaseous phase under the action of high energy light (see e.g. U.S. Patent Specifications Nos. 2,510,149 and 2,715,134). These processes, however, have serious disadvantages with the result that it is impossible to carry them out on a technical scale in a manner which is economical and, more important, free from danger. These arise because vigorous explosions are liable to occur if gaseous methylchlorosilanes and gaseous chlorine are introduced into a reactor in known manner and irradiated, e.g. with UV light, to cause them to react together [see e.g. W. Zimmermann, Chem. Berichte, 87, 887 (1954)]. Experiments have shown that powerful explosions are caused by small quantities of air or by localized concentrations of chlorine in the gaseous phase.

If methylchlorosilanes are chlorinated in the liquid phase by introducing gaseous chlorine into the liquid methylchlorosilanes in a reactor and irradiating the reactants with UV light in known manner, the gaseous chlorine is liable to form a gaseous phase comprising a large number of individual bubbles in the liquid near the point of entry of chlorine and this gaseous phase is liable to pass into the gas space situated above the surface of the liquid methylchlorosilane so that a possibility of explosion in this gaseous phase arises in this case also. A further disadvantage is the fact that localized high concentrations of chlorine occur in the liquid phase near the point at which gaseous chlorine is introduced into the liquid methylchlorosilane. These conditions cause a relatively high proportion of more highly chlorinated and in most cases undesirable byproducts to be formed and hence the yield of monochlorinated product to be reduced.

It is accordingly an object of the present invention to provide a simple, efficient and safe process and apparatus for reacting methylchlorosilanes and chlorine.

These and other objects and advantages are realized in accordance with the present invention pursuant to which there is provided a process for the production of chloromethyl chlorosilanes of the general formula:

$$(ClCH_2)_a(CH_3)_bSiCl_{4-a-b}$$

in which $a$ may represent 1, 2 or 3 and $b$ may represent 0, 1 or 2, the sum $a+b$ not exceeding 3, by reacting methlychlorosilanes of the general formula:

$$(CH_3)_{a+b}SiCl_{4-a-b}$$

with chlorine in liquid phase under the influence of irradiation which initiates the photochemical reaction of chlorine with methylchlorosilane, in which process chlorine and the methylchlorosilane are mixed in a first zone in which light which would initiate the photochemical reaction is excluded and the resulting solution is then exposed to radiation to initiate the photochemical reaction in a second zone. In this way the escape of gas from the first zone into the reaction zone is prevented.

It has surprisingly been found that when chlorinating methylchlorosilanes in liquid phase under the action of light, the difficulties mentioned above can be avoided if the chlorine is not fed into the reaction zone directly but is continuously dissolved in liquid methylchlorosilane to the required concentration in a mixing vessel preceding the reaction zone, and the resulting substantially homogeneous solution of chlorine in the methylchlorosilane is passed through a reactor in which it is irradiated, e.g. with visible or UV light, in such a manner that the dissolved chlorine undergoes complete reaction with the methylchlorosilane. With this process it is impossible for an explosive gas mixture to be formed in the reactor by the accumulation of gaseous chlorine above or below the liquid surface. A further advantage of the process according to the invention is that the feeding into the reactor of a homogeneous solution of chlorine in methylchlorosilanes prevents the occurrence of high local chlorine concentrations in the reaction zone thereby greatly reducing the proportion of more highly chlorinated, usually unwanted, by-products and increasing the yield of the monochlorinated product.

This process is also found to have an additional advantage. If, in accordance with the invention, gaseous chlorine is not fed into the reactor but is dissolved in the liquid methylchlorosilane in a mixing vessel preceding the reactor and the solution formed is passed through a reactor in such manner that complete reaction of the dissolved chlorine with methylchlorosilane is effected under the influence of irradiation, the process can easily be carried out in such a manner that all the hydrogen chloride formed in the reaction, instead of being released in the reactor or reaction zone as in the known processes, is released only subsequently in a degasification vessel following the reactor, or in a subsequent distillation stage. The troublesome formation of bubbles or foam in the reactor, which normally occurs in liquid phase chlorination and makes the process difficult to carry out, is thereby completely prevented and consequently a much smaller and hence a more economically designed reactor can be used.

The process according to the invention is carried out basically by adding chlorine to a methylchlorosilane in a zone which is impervious to light. A substantially homogeneous solution of chlorine in the methylchlorosilane is obtained. This chlorine containing solution is then introduced into a reaction vessel where the reaction proper takes place under the action of high energy radiation.

The reaction mixture comprising substantially chlorinated methchlorosilane and possibly small quantities of unreacted starting material and more highly chlorinated products, is subsequently subjected to a separating process, generally distillation, to give the desired product in a very pure form.

The starting materials used for the process according to the invention are methylchlorosilanes of the general formula:

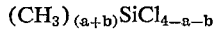

which are prepared by known methods.

In order to achieve as homogeneous a solution of chlorine in methylchlorosilane as possible, the required quantity of chlorine is introduced into the silane with the aid of suitable devices such as gasification valves, ring sprays or the like.

The temperature at which chlorine is added to chlorosilanes is not particularly critical but it is advisable to operate at temperatures in the range of from $-76°$ C. to $+70°$ C., preferably from $0°$ C. to $50°$ C.

The pressure conditions are not critical either. The process may be carried out at sub-atmospheric, normal or excess pressure, the only factor to be taken into account being the influence of pressure on the solubility of chlorine in the particular methylchlorosilane used. The pressure may vary in different parts of the apparatus.

The process according to the invention will now be explained more fully with reference to a particularly advantageous embodiment, illustrated in the form of a flow sheet in the accompanying drawing.

In this illustrative, non-limiting embodiment the reference numerals 1, 2, 5, 7, 13, 15, 19, 20 and 21 refer to inlet and outflow tubes; 3 a mixing vessel; 4 a gasification valve; 6 an overflow; 9 a stabilising vessel; 10 a reaction vessel; 11 represents lamps; 12 a degasification vessel; 14 a layer of packing bodies; 16 a distillation column; 17 the sump of the distillation column; and 18 is a condenser.

The methylchlorosilane 1 of the formula:

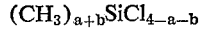

which it is required to chlorinate is fed into the cycle at 2. From the inlet 2, it enters the bottom of the light impervious mixing vessel which is filled with methylchlorosilane up to the overflow 6 when a cycle is in operation. The required quantity of chlorine is supplied to the methylchlorosilane of the above formula by introducing it into the lower part of the mixing vessel 3 at 4 by means of a ring spray or gasification valve.

If the quantity of chlorine fed into the mixing vessel 3 is less than the methylchlorosilane flowing through the vessel can dissolve, the bubbles of chlorine gas emitted at 4 are completely dissolved in the liquid phase. As the reactants continue to flow through the mixing vessel, they are thoroughly mixed so that a homogeneous solution of chlorine in the methylchlorosilane is obtained at the overflow 6. Mixing can be effected by stirring or by means or built-in flow obstructors or packing bodies. The homogeneous solution flows from the overflow into the reactor 10 by way of a stabilizing vessel 9.

If, due to a failure in the control of the chlorine flow or a faulty operation at 4 more chlorine is fed into the vessel than is soluble in the quantity of methylchlorosilane flowing through it (circumstances which always lead to the formation of an explosive gaseous phase and frequently to explosions or detonations when chlorine is introduced directly into a reactor), the bubbles of chlorine gas break through the surface 8 of the liquid and can be removed safely through a pipe 7. Even in such cases only a solution of chlorine in the methylchlorosilane containing at most only slightly more than the optimum amount of chlorine in respect of preventing the formation of more highly chlorinated by-products passes through the stabilizing vessel 9 into the reactor. Passage of gaseous chlorine into the reactor and the possibility of formation of an explosive gaseous phase, however, is impossible.

The heat produced when chlorine dissolves in the methylchlorosilane can be removed by heat exchangers (not shown in the figure) installed in the mixing vessel 3. The solution in the mixing vessel 3 can thereby be adjusted to a temperature between the melting point and the boiling point of the methylchlorosilane, preferably from $0°$ C. to $50°$ C. There is no lower limit to the quantity of chlorine supplied to the methylchlorosilane at 4. The upper limit is determined by the solubility of chlorine in the methylchlorosilane which is to be chlorinated at the particular pressure and at the temperature to which the mixing vessel 3 is adjusted. At normal pressure the quantity fed in is preferably about 1 to 10 mole percent of $Cl_2$, based on the quantity of the methylchlorosilane flowing through the mixing vessel 3.

The solution, which is completely free from bubbles as it enters the reactor 10, is irradiated therein with visible light or with UV light. In the case of a completely or partly transparent reactor, the light may be supplied from lamps 11 situated outside the reactor, as shown in the drawing, but it may also be supplied from light sources arranged inside the reactor. The reaction between the dissolved chlorine and the methylchlorosilane now takes place under the action of light as the solution flows through the reactor yielding the corresponding chloromethyl chlorosilane and hydrogen chloride. As already mentioned, in the process according to the invention the hydrogen chloride is advantageously not degassed in the reactor but in a following degasification vessel 12 which may contain packing bodies to facilitate the degasification. The liberated hydrogen chloride is removed through the tube 13. Since the heat of reaction liberated in the reaction zone can be easily removed by means of a heat exchanger (omitted from the drawing for the sake of clarity) installed in the reactor 10, the reactor can be maintained at a temperature at which no gas bubbles can occur.

The solution leaving the degasification vessel 12 enters the distillation stage 16 at 15 by way of an overflow. In this distillation vessel, which may be operated at normal, excess or sub-atmospheric pressure, unreacted methylchlorosilane is evaporated at temperatures above the boiling point of the unchlorinated product but below the boiling point of the monochlorinated product, being returned to the chlorination plant through pipe 19 after condensation in the condenser 18. Any residual hydrogen chloride liberated in the distillation vessel is removed through the vapor pipe 21. Chlorinated methylchlorosilane collects in the sump 17 of the distillation stage and is continuously removed through the overflow 20 while new starting material is fed into the cycle at the same rate at 2.

Chloromethyl chlorosilanes obtained by the process according to the invention are valuable starting materials for the synthesis of various organofunctional silanes and siloxanes.

The process according to the invention is now explained in more detail with the aid of the following examples.

EXAMPLE 1

The plant illustrated in the enclosed figure was charged with trimethylchlorosilane, and 4.8 mole percent of chlorine (based on the quantity of the silane) was introduced from the ring spray 4 into the trimethylchlorosilane flowing through the mixing vessel 3. The temperature in the mixing vessel 3 was $25°$ C. in front of the heat exchanger and $18°$ C. behind the heat exchanger. The homogeneous solution entered the reactor as described above. The temperature was $18°$ C. at the inlet into the reactor and 35° C. at the outlet. The reaction product was passed through the degasification vessel 12 to enter the distillation stage 16 in which unreacted trimethylchlorosilane was evaporated as described above and returned to the cycle after condensation by the condenser 18. The chlorinated product collected in the sump of the distillation stage was continuously removed at 20.

The temperature at the head of the distillation column was 58° C., which is the boiling point of trimethylchlorosilane, and the sump temperature was 100° C. when a steady state had been reached. The product continuously removed from the sump had the following composition:

| Product: | Proportion in percent by weight |
|---|---|
| $(CH_3)_3SiCl$ | 8.8 |
| $ClCH_2(CH_3)_2SiCl$ | 87.5 |
| Higher boiling by-products | 3.7 |
| | 100.0 |

EXAMPLE 2

The plant illustrated in FIG. 1 was charged with dimethyldichlorosilane, and 5.4 mole percent of chlorine (based on the quantity of the silane) was fed into the dimethyldichlorosilane flowing through the mixing vessel 3. The temperature in the mixing vessel was 26° C. in front of the heat exchanger, 16° C. behind it. A homogeneous solution entered the reactor to undergo reaction. The temperature at the inlet into the reactor was 16° C. and the temperature at the outlet was 36° C. The reaction product was separated in a distillation stage as described in Example 1. The temperature at the head was 70° C. and the sump temperature was 105° C. The chlorinated product continuously removed from the sump had the following composition:

| Product: | Proportion in percent by weight |
|---|---|
| $(CH_3)_2SiCl_2$ | 12.4 |
| $ClCH_2CH_3SiCl_2$ | 84.0 |
| Higher boiling by-products | 3.6 |
| | 100.0 |

EXAMPLE 3

The plant illustrated in FIG. 1 was charged with methyltrichlorosilane, and 5.3 mole percent of chlorine (based on the quantity of the silane) was fed into the methyltrichlorosilane flowing through the mixing vessel. The temperature in the mixing vessel was 26° C. in front of the heat exchanger, 18° C. behind it. A homogeneous solution entered the reactor to undergo reaction. The temperature at the inlet into the reactor was 18° C. and the temperature at the outlet was 36° C. The reaction product was separated in the distillation stage as described in Example 1. The head temperature was 66° C. and the sump temperature 100° C. The product continuously removed from the sump had the following composition:

| Product: | Proportion in percent by weight |
|---|---|
| $CH_3SiCl_3$ | 19.9 |
| $ClCH_2SiCl_3$ | 64.8 |
| Higher boiling by-products | 15.3 |
| | 100.0 |

COMPARISON EXAMPLE

In a plant which operated by the known process described in the literature, it was intended to chlorinate trimethylchlorosilane by introducing gaseous chlorine into a reactor through which liquid starting material flowed and which was irradiated with externally supplied UV light. The temperatures in the reactor were 26° C. at the inlet and 28° C. at the outlet. Even in the initial stage, when only about 0.5 mole percent of chlorine (based on the quantity of trimethylchlorosilane flowing through the reactor) had been introduced, a detonation occurred in the reactor after 5 minutes. As far as could be seen, it took place near the point of introduction of chlorine into the reactor. The experiment was thereupon discontinued.

It will be appreciated that the instant specification and examples are set forth by way of illustration and not limitation, and that various modifications and changes may be made without departing from the spirit and scope of the present invention.

What is claimed is:

1. In the production of a chloromethyl chlorosilane of the formula:

in which $a$ is 1, 2 or 3, $b$ is 0, 1 or 2, and the sum of $a+b$ is not greater than 3,
by reacting a methylchlorosilane of the formula:

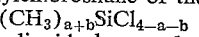

with chlorine in the liquid phase and under the action of radiation which initiates the photochemical reaction between chlorine and the methylchlorosilane, the improvement which comprises mixing the chlorine and the methylchlorosilane in a first zone with exclusion of light which would initiate the photochemical reaction, contacting the solution with a gas space whereby any undissolved chlorine passes from the solution into said gas space, thereafter introducing the resulting solution free of undissolved gas into a second zone separate from said first zone, and exposing said solution to radiation to initiate the photochemical reaction in said second zone.

References Cited
UNITED STATES PATENTS 2,612,510  9/1952  Hatcher et al.  204—158 R
3,437,573  4/1969  Hurley et al.  204—163 R HOWARD S. WILLIAMS, Primary Examiner U.S. Cl. X.R.

23—260; 250—527